UNITED STATES PATENT OFFICE.

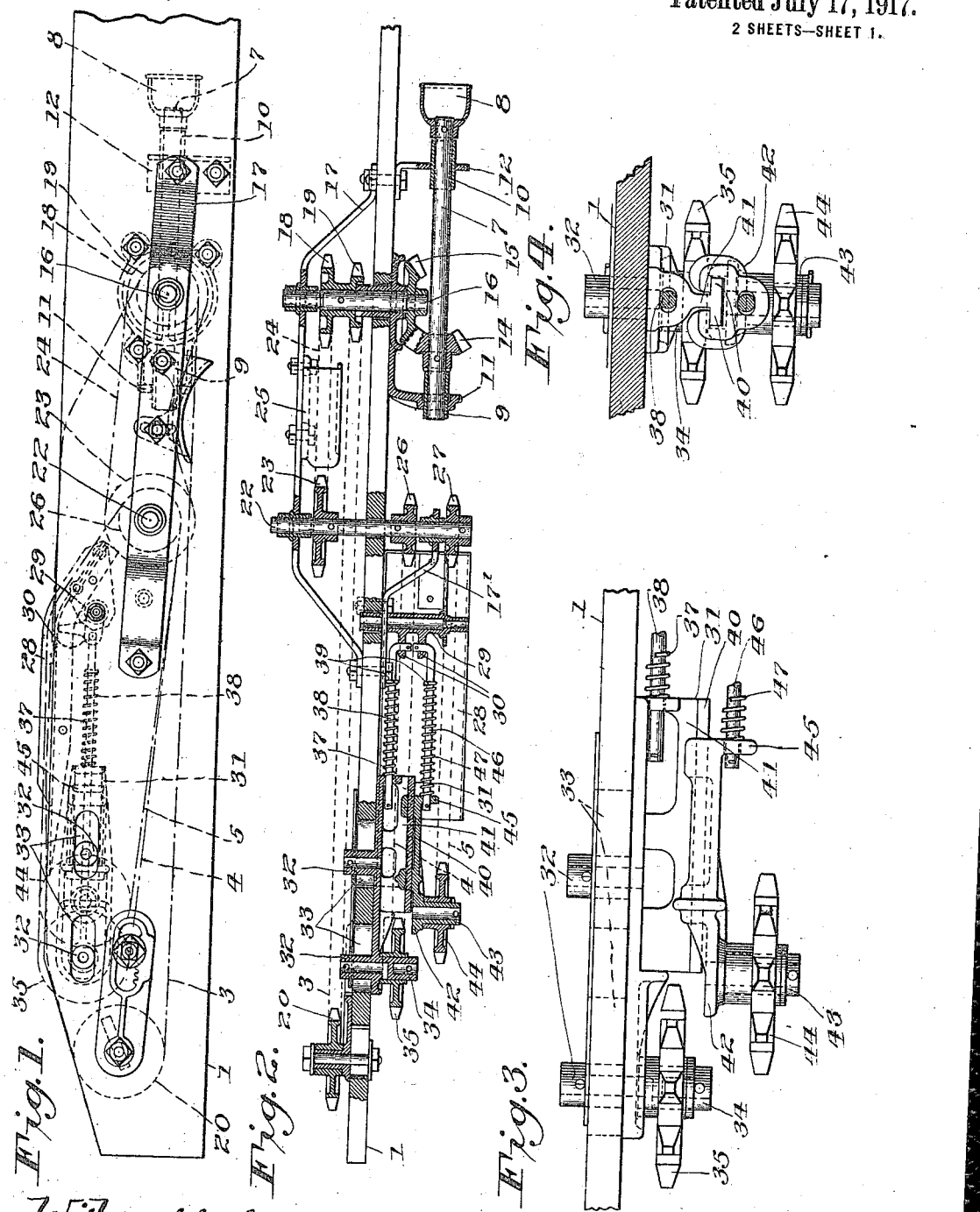

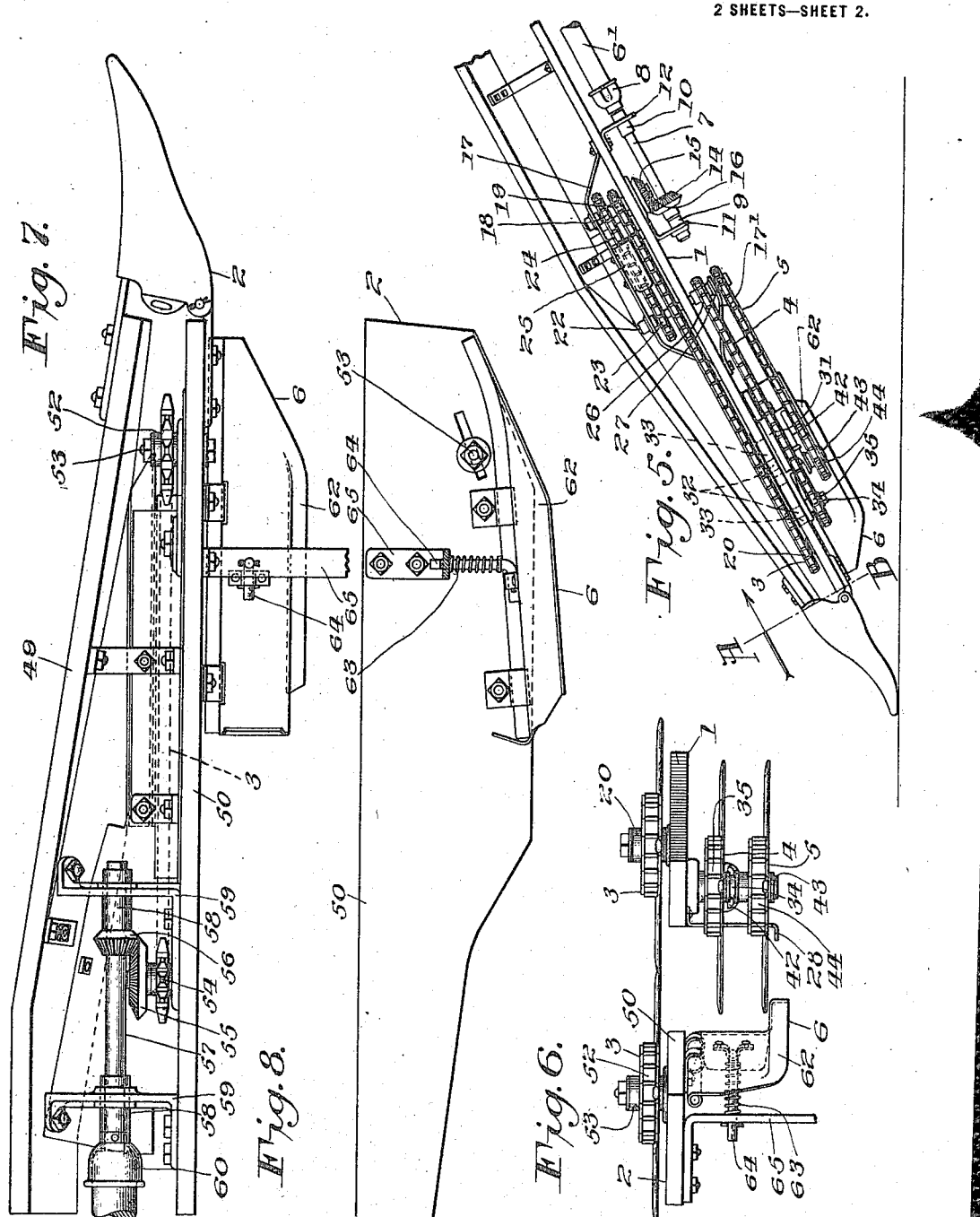

JOHN A. STONE, OF CHICAGO, ILLINOIS, ASSIGNOR TO INTERNATIONAL HARVESTER COMPANY OF NEW JERSEY, A CORPORATION OF NEW JERSEY.

CORN-HARVESTER.

1,233,418.   Specification of Letters Patent.   Patented July 17, 1917.

Application filed November 21, 1913. Serial No. 802,246.

*To all whom it may concern:*

Be it known that I, JOHN A. STONE, a citizen of the United States, residing at Chicago, in the county of Cook and State of Illinois, have invented certain new and useful Improvements in Corn-Harvesters, of which the following is a full, clear, and exact specification.

My invention relates to corn harvesters in its general adaptation, and is particularly designed for use in connection with machines of the same class commonly called corn pickers and huskers, and consists in improved means for gathering in the stalks in advance of the snapping rollers, and is an improvement on the mechanism shown in my Patent No. 949,736, February 15, 1910.

The object of my invention is to provide means for engaging such ears of corn as may be hanging close to the ground in a manner to deliver them to the conveyers that they may be carried to the husking mechanism.

These objects are attained by means of the mechanism illustrated in the accompanying drawings, in which—

Figure 1 is a top plan view of part of the front end of one of the stalk gathering members having a part of my invention embodied therein;

Fig. 2 is a vertical longitudinal section of Fig. 1;

Fig. 3 is a detail part of the carrying mechanism on an enlarged scale, as shown in Figs. 1 and 2;

Fig. 4 is an end elevation of Fig. 3;

Fig. 5 is a side elevation of part of the gathering mechanism of the machine;

Fig. 6 is a cross section of Fig. 5 along line A—B;

Fig. 7 is a side elevation of part of the gathering mechanism on an enlarged scale as viewed from the opposite side, as shown in Fig. 5; and Fig. 8 is a bottom plan view of part of Fig. 7.

Referring to the drawings, wherein the same reference numerals designate like parts throughout the several views, the stalk advancing mechanism includes two supporting frame members 1 and 2, spaced apart and inclined upward from front to rear, adapted to receive a row of corn between them, each member having the usual gathering and stalk advancing finger provided chains 3 mounted thereon, the member 1 having supplemental upper and lower stalk engaging finger provided chains 4 and 5, respectively, and member 2 a yielding plate 6 mounted in a manner to oppose a pressure of the stalks carried by the chains 4 and 5.

Motion is transmitted from an operative part of the machine to the gathering mechanism carried by the member 1 by means including a shaft 6¹, having its front end connected with the rear end of a shaft 7 by means of a universal coupling member 8, the shaft 7 being journaled in front and rear bearing boxes 9 and 10, respectively, that are carried by bracket members 11 and 12, that are secured to the frame member 1. Secured to the shaft 7, near its front end, is a bevel pinion 14 that meshes with a corresponding pinion 15 secured to the lower end of a short shaft 16 that is journaled in bearings carried by the frame member 1 and the bracket member 17. Secured to the shaft 16 are upper and lower sprocket wheels 18 and 19, respectively, and 20 represents a sprocket wheel that is adjustably mounted upon the front end of the frame member 1 and one of the upper stalk advancing chains 3 is carried by sprocket wheels 19 and 20. 22 represents a shaft journaled in bearings carried by the bracket member 17 and a supplemental bracket member 17¹, secured to the lower side of the diagonal member 1, and having secured to its upper end a sprocket wheel 23 that derives motion, by means of a sprocket chain 24, from the sprocket wheel 18, and 25 represents an adjustable chain tightener engaging with the chain 24 and carried by the bracket member 17. 26 and 27 represent upper and lower sprocket wheels, respectively, that are secured to the lower end of shaft 22. 28 represents a vertically disposed chain guiding plate having its upper side secured to the frame member 1, and 29 a vertically arranged tubular member carried by the frame member 1 and the plate 28, and having forwardly extending ear members 30, spaced apart and having vertically arranged openings therein. 31 represents a sprocket wheel supporting member having vertically arranged cylindrical members 32 that are slidably received by longitudinally disposed slotted openings 33 in the frame member 1, and a depending stem 34 at its front end upon which is journaled a sprocket wheel 35, that is operatively connected with sprocket wheel 26 upon shaft 22 by the upper supplemental stalk advancing chain 4, the chain being given proper tension by means of a compression spring 37 carried by a link 38, having one end slidably received by an opening in the rear end of the supporting member 31, and its opposite end connected to one of the ear members 30 forming part of the member 29; the spring 37 being operative between a shoulder 39 on the link 38 and the end of the sprocket wheel supporting member 31 in a manner to move the member 31 against the tension of the chain 4. The sprocket wheel supporting member 31 includes longitudinally disposed guideways 40 arranged upon opposite sides of a centrally arranged web portion 41, and 42 represents a sprocket wheel supporting bracket slidably mounted upon the ways 40, having a depending stem 43 at its front end, upon which is journaled a sprocket wheel 44, and a depending ear member 45 at its opposite end, having an opening therein that slidably receives one end of a link 46, the opposite end of the link being connected with the remaining ear member 30, and 47 represents a spring carried by the link and operative to move the bracket member 42 against the tension of the lower supplemental stalk engaging sprocket chain 5 carried by the sprocket wheels 44 and 27 in the same manner as spring 37, but independently thereof.

The supporting frame member 2, upon the opposite side of the stalk passageway, includes upper and lower frame members 49 and 50, respectively, between which one of the opposing stalk advancing chains 3 operates, the chain being mounted at the front end of the frame upon a sprocket wheel 52 journaled upon a stud 53 secured to the lower frame member, and extending rearward is driven by a combined sprocket wheel 54 and pinion 55, the pinion meshing with a pinion 56 secured to a longitudinally arranged shaft 57 journaled in bearing boxes 58 carried by brackets 59 secured to the upper and lower frame members 49 and 50; the shaft being provided, at its rear end, with a universal coupling member 60 whereby it may be connected with an operative part of the machine. Pivotally mounted upon the lower front end of the frame member 50, and upon the bottom of its inner side, opposite the supplemental stalk advancing chains 4 and 5, is the longitudinally disposed depending plate 6, having an inwardly and downwardly turned ledge or flange 62 at its lower side, the plate being yieldingly held against the pressure of the advancing stalks carried by the chains 4 and 5 by means of a compression spring 63 carried by a stud 64, having one end secured to the plate and its opposite end slidably received by an opening in a bracket member 65 secured to the frame member 50.

In the operation of machines of the character described, the opposing stalk engaging and advancing chains 3 will successfully handle the bulk of the stalks and present them properly to the snapping rollers; but in corn that is badly tangled and in prostrate or semi-prostrate position, with the heads of the stalks directed toward the machine, the points of the gatherers running upon the ground will lift the stalks and they will be engaged by the stalk advancing chains; but the ears that hang down from the stalks are frequently loosened before they have reached the conveyer mechanism and are dropped upon the ground. In my improved mechanism the supplemental stalk advancing chains 4 and 5, carried upon the row straddling members, will coöperate with the yielding plate 6 and engage with the ears as the stalks are being raised by the chains, as shown in my patent as noted above, and deliver them to the carrier mechanism.

While I have shown and described a preferred form of my invention, it is to be understood that I do not wish to confine it to the specific details of construction as described, as many minor changes may be made without departing from the spirit of my invention.

What I claim as my invention, and desire to secure by Letters Patent, is:

1. In a corn harvester, spaced gathering boards, stalk gathering mechanism carried thereon, and a supplemental gatherer, yieldable longitudinally, operatively connected beneath the latter and adjacent the ground having fingers extending into the interval between said gathering boards.

2. In a corn harvester, spaced gathering boards, stalk gathering mechanism carried thereon, and a supplemental stalk gathering chain, yieldable longitudinally, carried on said frame, operatively connected to said stalk gathering mechanism and disposed in a plane beneath the front end of the same and adjacent the ground.

3. In a corn harvester, spaced gathering boards, stalk gathering mechanism carried thereon, and a plurality of superimposed supplemental gathering chains, yieldable longitudinally, carried on one of said frame members beneath said gathering mechanism and operatively connected to the latter.

4. In a corn harvester, a plurality of spaced gathering boards, stalk gathering mechanism carried thereon, a supplemental stalk gathering chain carried on one of said gathering boards in a plane beneath said gathering mechanism and operatively connected thereto, and means including a shiftable sprocket wheel maintaining said chain yieldable relative to stalks passing between said gathering boards.

5. In a corn harvester, a plurality of spaced gathering boards, stalk gathering mechanism carried thereon, a plurality of supplemental stalk gathering chains carried on one of said gathering boards beneath said stalk gathering mechanism and operatively connected to the latter, and mechanism shiftable longitudinally for maintaining each of said chains independently yieldable relative to the stalks passing between said gathering boards.

6. In a corn harvester, a plurality of spaced gathering boards, stalk gathering mechanism carried thereon, a supplemental longitudinally yieldable stalk engaging chain carried on one of said gathering boards operatively connected to said gathering mechanism and disposed in a plane beneath the same, and a yielding plate carried on the opposite gathering board opposite said chain.

7. In a corn harvester, a plurality of spaced gathering boards, stalk gathering mechanism carried thereon, a plurality of superimposed supplemental longitudinally yieldable stalk gathering chains carried on one of said gathering boards operatively connected to said gathering mechanism and disposed beneath the same, and a downwardly extending yielding plate carried on the opposite gathering board opposite said gathering chains.

8. In a corn harvester, in combination, upwardly and rearwardly inclined spaced stalk guiding members adapted to straddle a row of corn, stalk engaging and advancing means carried by one of said members including upper main gathering and stalk advancing chains, longitudinally yieldable supplemental stalk engaging and advancing devices located below and at the front end of one of said upper chains, and a yielding wall carried by the other guiding member and opposing said supplemental stalk engaging devices.

9. In a corn harvester, in combination, upwardly and rearwardly inclined spaced stalk guiding members adapted to straddle a row of corn, stalk engaging and advancing means carried by one of said members including upper main gathering and stalk advancing chains, longitudinally yieldable supplemental stalk engaging and advancing devices disposed below and at the front end of one of said upper chains, and a spring-pressed pivotally mounted plate carried by the other guiding member and opposing said supplemental gathering devices.

10. In a corn harvester, a plurality of spaced gathering boards, a depending plate resiliently mounted on one of the same and having a substantially horizontally disposed ledge, stalk gathering mechanism carried on said gathering boards having fingers extending into the interval between the same, and supplemental stalk gathering mechanism disposed beneath said first mentioned stalk gathering mechanism and operatively connected thereto, carried on the other gathering board opposite said plate and having fingers extending into the interval between said members in a plane above the ledge on said plate.

11. In a corn harvester, a plurality of spaced gathering boards, stalk gathering mechanism comprising a stalk gathering chain carried on each of said gathering boards having fingers protruding into the interval between the latter, a resiliently mounted plate carried on one of said frame members having a laterally disposed flange extending into the interval between said members, and a plurality of superimposed gathering chains operatively connected to said first mentioned gathering chains and carried on the other gathering board beneath one of said chains, said supplemental chains having fingers extending into the interval between the same and said resiliently mounted plate.

12. In a corn harvester, coöperating yieldably mounted members for engaging and gathering stalks, one of said members being a plate and the other a chain, and means operatively connected with the chain to permit it to yield longitudinally.

13. In a corn harvester, spaced gathering boards, and supplemental engaging and gathering mechanism including a plate yieldably mounted on one of said gathering boards and a longitudinally yieldable gathering chain mounted on another of said gathering boards opposite said plate.

In testimony whereof I affix my signature, in the presence of two witnesses.

JOHN A. STONE.

Witnesses:
 FERDINAND HACKER,
 C. H. BURNS.

Copies of this patent may be obtained for five cents each, by addressing the "Commissioner of Patents, Washington, D. C."